United States Patent [19]

Kawamura et al.

[11] Patent Number: 4,862,380
[45] Date of Patent: Aug. 29, 1989

[54] NUMERICAL CONTROL UNIT

[75] Inventors: Hideaki Kawamura; Takao Sasaki, both of Tokyo, Japan

[73] Assignee: Fanuc Ltd, Minamitsuru, Japan

[21] Appl. No.: 143,129

[22] PCT Filed: Apr. 8, 1987

[86] PCT No.: PCT/JP87/00217
§ 371 Date: Dec. 4, 1987
§ 102(e) Date: Dec. 4, 1987

[87] PCT Pub. No.: WO87/06364
PCT Pub. Date: Oct. 22, 1987

[30] Foreign Application Priority Data

Apr. 8, 1986 [JP] Japan .................. 61-80868

[51] Int. Cl.⁴ .................. G06F 15/46; B24B 19/08
[52] U.S. Cl. .................. 364/474.11; 364/474.14; 318/625
[58] Field of Search .................. 318/625; 364/474.11, 364/474.14, 474.01, 474.02

[56] References Cited

U.S. PATENT DOCUMENTS

| | | | |
|---|---|---|---|
| 4,424,569 | 1/1984 | Imazeki | 364/474.11 |
| 4,586,124 | 4/1986 | Wiederstein | 318/625 |
| 4,608,643 | 8/1986 | Breitenstein | 364/474.11 |
| 4,624,607 | 11/1986 | Kato | 364/474.14 |
| 4,683,786 | 8/1987 | Kersten | 364/474.14 |
| 4,684,862 | 8/1987 | Röhrle | 364/474.11 |

Primary Examiner—Michael R. Fleming
Attorney, Agent, or Firm—Staas & Halsey

[57] ABSTRACT

A numerical control unit grips a bar-shaped workpiece (18) at two points longitudinally of the workpiece by gripping members (16, 17), and rotates the gripping members synchronously by respective spindle motors (14, 15). The workpiece is subjected to turning machining by a cutter (25) while the gripping members are being synchronously rotated, and an end face of the workpiece is thereafter subjected to separate machining. The unit synchronously controls a first axis along which the first spindle motor (14) is moved in the horizontal direction and a second axis along which the second spindle motor (15) is moved in the horizontal direction in accordance with numerical information regarding the first axis in response to a synchronous control command. The first and second axes are controlled in accordance with numerical information regarding each of the first and second axes in response to an independent control command.

3 Claims, 2 Drawing Sheets

NUMERICAL CONTROL UNIT

BACKGROUND OF THE INVENTION

This invention relates to a numerical control unit and, more particularly, to a numerical control unit for synchronously controlling first and second axes, as the occasion may demand, along which first and second members are respectively moved in the same direction, or for controlling these axes independently.

When a workpiece is subjected to machining, there are occasions where plural types of processing machinery are required. For example, there are cases where a workpiece is subjected to turning work, after which the workpiece, which has been machined into a cylindrical configuration by the turning work, is cut off, followed by drilling a screw hole in the cut face. In this instance, a lathe and a drill are required. When such is the case, the conventional practice is for the operator to set the workpiece for the drill at the conclusion of the machining performed by the lathe.

Thus, when a workpiece is machined using plural types of processing machinery in the prior art, the operator must set the workpiece for each type of processing machinery. The problem that results is inefficient machining.

SUMMARY OF THE INVENTION

Accordingly, an object of the present invention is to provide a numerical control unit which makes possible machining by plural types of processing machinery without requiring that the operator reset the workpiece.

In order to solve the aforementioned problem, the present invention provides a numerical control unit for controlling motion along each axis in accordance with numerical information, wherein movement along first and second axes is controlled synchronously in accordance with numerical information regarding the first axis in response to a synchronous control command, and movement along the first and second axes is controlled in accordance with numerical information regarding each of the first and second axes in response to an independent control command.

DESCRIPTION OF THE PREFERRED EMBODIMENT

Figure 1:
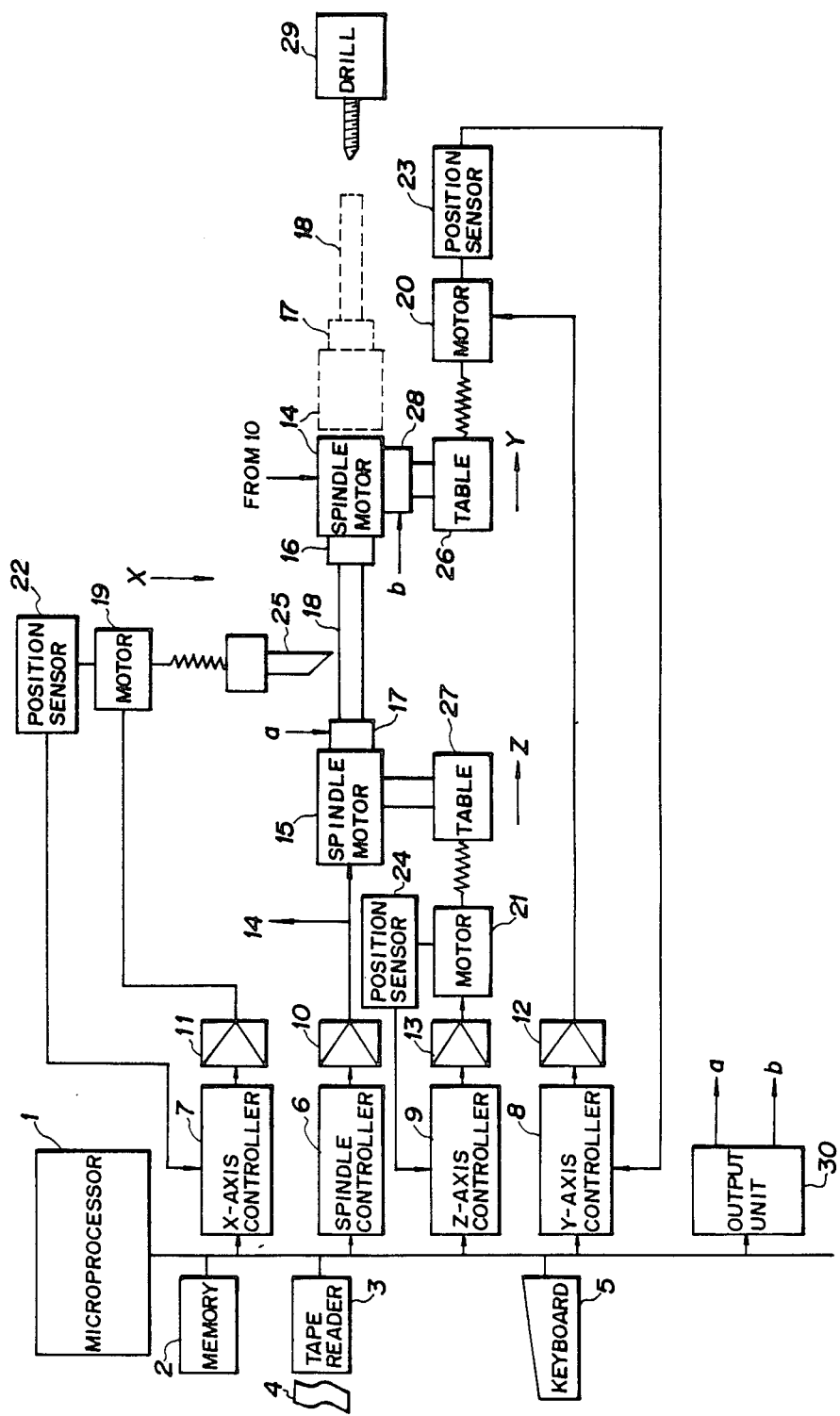
FIG. 1 is a block diagram of an embodiment of the invention.

FIG. 1 is a block diagram of an embodiment of the invention, in which numeral 1 denotes a microprocessor; 2 a memory in which is stored a control program that causes the microprocessor 1 to perform a predetermined operation; 3 a tape reader; 4 a command tape on which command blocks (NC data) are recorded; 5 a keyboard; 6 a spindle controller; 7, 8 and 9 X-, Y- and Z-axis controllers, respectively; 10-13 drive circuits for spindle motors and the respective axes; 14 and 15 spindle motors; 16 and 17 chucks; 18 a workpiece; 19 a motor for transporting a cutter 25 along the X axis; 20 and 21 motors for respectively transporting tables 26, 27, on which the respective spindle motors 14, 15 are mounted, in horizontal directions (the horizontal direction of the table 26 is taken as the direction along the Y axis and the horizontal direction of the table 27 is taken as the direction along the Z axis); 22 -24 position sensors; 28 a rotary mechanism; 29 a drill; and 30 an output unit. The chuck 17 grips the workpiece 18 if a signal a outputted by the output unit 30 is "1" and releases the workpiece 18 if the signal a is "0". The rotary mechanism 28 changes the orientation of the spindle motor 14 by 180 degrees, depending upon whether a signal b outputted by the output unit 30 is "1" or "0". The state indicated by the solid lines in FIG. 1 prevails when b="1" holds, and the state indicated by the dashed lines prevails when b="0" holds.

Figure 2:
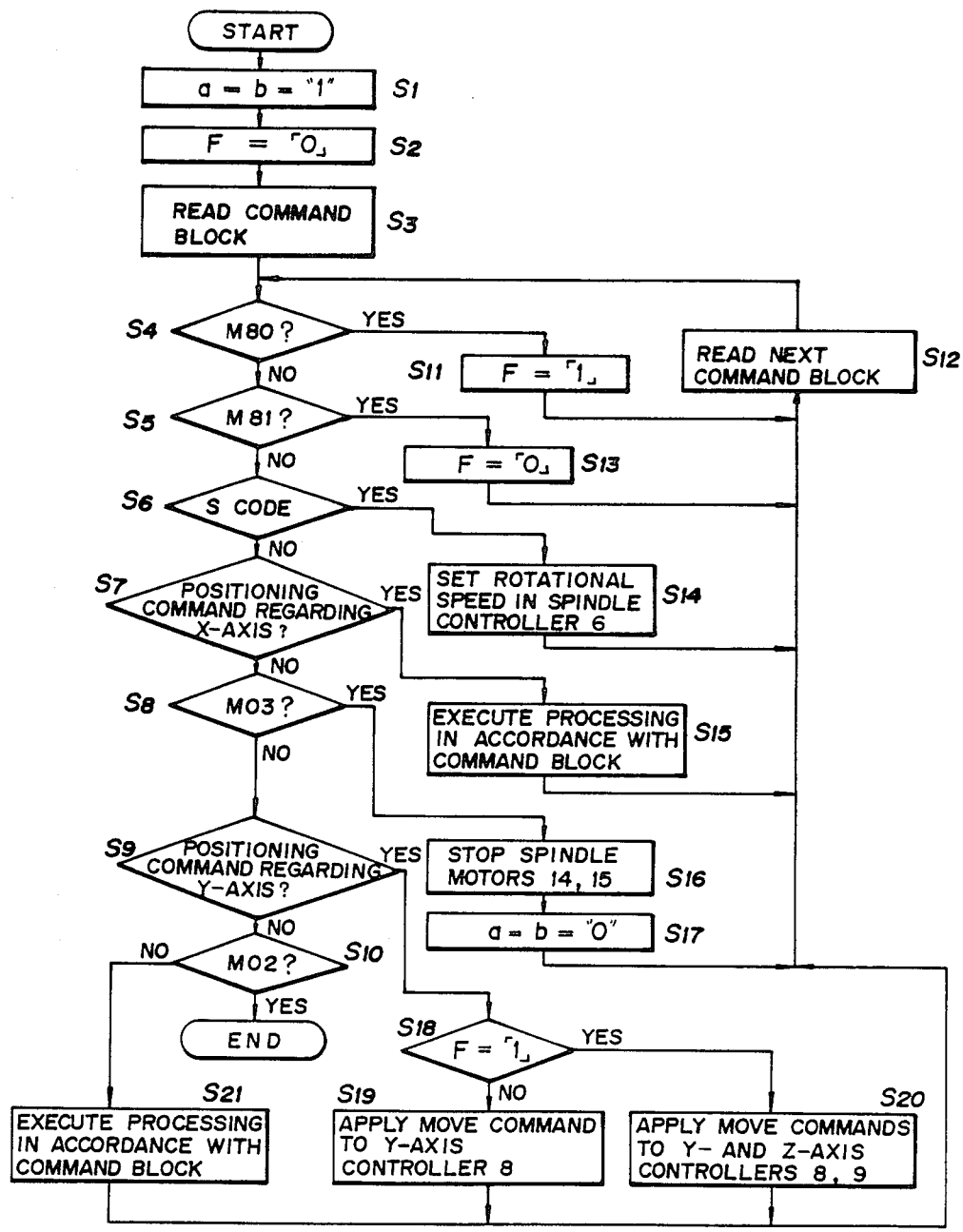
FIG. 2 is a flowchart showing the contents of processing executed by a microprocessor of FIG. 1.

FIG. 2 is a flowchart illustrating the contents of processing executed by the microprocessor 1. This Figure will now be referred to in order to describe the operation of FIG. 1.

The operator first mounts the workpiece 18 in the chucks 16, 17, as shown in FIG. 1 and then inputs a machining start command from the keyboard 5. When the machining start command is inputted thereto, the microprocessor 1 applies a control signal to the output unit 30, whose output signals a, b are both made "1"(step S1). Next, a flag F indicating whether synchronous running is in effect is set to "0" (step S2), after which one block of command blocks recorded on the command tape 4 is read by the tape reader 3 (step S3). In this case, it is assumed that the following command blocks (a) through (h) have been recorded on the command tape 4:

| | |
|---|---|
| $S\underline{s}$; | (a) |
| $G00X\underline{x}$; | (b) |
| M80; | (c) |
| $G01Y\underline{y1}F\underline{f1}$; | (d) |
| $X\underline{x1}F\underline{f1}'$; | (d)' |
| M05; | (e) |
| M81; | (f) |
| $G01Y\underline{y2}F\underline{f2}$ | (g) |
| M02; | (h) |

The command block (a) is for commanding a rotational speed s of the spindle, the command block (b) is for commanding positioning along the X axis, the command block (c) is for commanding synchronous control of the Y and Z axes, the command block (d) is for commanding an amount of travel $\underline{y1}$ and a traveling velocity $\underline{f1}$ along the Y axis, the command block (d)' is for commanding turning work along the X axis, the command block (e) is for commanding stopping of the spindle, the command block (f) is for commanding independent control of the Y axis, the command block (g) is for commanding an amount of travel $\underline{y2}$ and a traveling velocity $\underline{f2}$ along the Y axis, and $\overline{M02}$ is a command block indicating the end of the machining program.

When the microprocessor 1 reads the command block (a) (step S3) and determines that the command block (a) is that which commands the rotational speed s of the spindle (step S6), the microprocessor sets the rotational speed s in the spindle controller 6 (step S14) to rotate the spindle motors 14, 15 at the commanded rotational speed. Next, when the microprocessor 1 reads the command block (b) (step S12) and determines that the command block (b) is that which commands positioning with regard to the X axis (step S7), the microprocessor applies a numerical value indicating the amount of travel of the cutter 25 to the X-axis controller 7 (step S15) to position the cutter 25 at a prescribed position. Next, when the command block (c) is read (step S12) and it is determined that the command block (c) is that which commands synchronous control of the Y and Z axes (step S4), the microprocessor 1 sets the flag F to "1" (step S11) and then reads the command block (d) (step S12).

When it is determined that the command block (d) read at step S12 is a move command regarding the Y axis (step S9), the microprocessor 1 determines whether the flag F is "1", namely whether synchronous operation is in effect (step S18). In this case, since the flag F will have been set to "1" at reading of the command block (c), the result of the decision at step S18 is YES, so that the microprocessor 1 executes the processing of step S20. Specifically, the processing executed by the microprocessor 1 at step S20 applies the amount of travel y1 and the traveling velocity f1 commanded by the command block (d) to the Y- and Z-axis controllers 8, 9, thereby moving the spindle motors 14, 15 synchronously in the horizontal direction (along the Y and Z axes) at the commanded velocity f1 and over the commanded distance y1 to subject the workpiece 18 to turning work.

Thereafter, when the command block (d)' is read (step S12) and it is determined that this command block is a cutting command for the X axis (step S7), the cutter 25 is moved along the X axis at the cutting velocity f1' over the distance x1 in accordance with the command block (d)', thereby cutting off the workpiece 18.

Next, when the command block (e) is read (step S12) and it is determined that this command block is that for commanding stopping of the spindle (step S3), the microprocessor 1 stops the spindle motors 14, 15 (step S16) and then applies a control signal to the output unit 30 so that the output signals a, b thereof are set to "0" (step S17). As a result, the chuck 17 releases the workpiece 18 on the side of the spindle motor 15 and the rotary mechanism 28 turns the spindle motor 14 by 180 degree (i.e. places the spindle motor 14 in the orientation indicated by the dashed lines in FIG. 2) to face the cut face of the workpiece 18 on the side of spindle motor 14 toward the drill 29.

Next, when the command block (f) is read (step S12) and it is determined that this command block is that for commanding independent control of the Y axis (step S5), the microprocessor 1 sets the flag F to "0"(step S13) and then reads the next command block (g) (step S12). When it is determined that the command block (g) read at step S12 is a move command for the Y axis (step S9), the microprocessor 1 determines whether the flag F is "1" (step S18). In this case, since the flag F will have been set to "0" at reading of the command block (f), the result of the decision at step S18 is NO, so that the microprocessor 1 executes the processing of step S19. The processing executed by the microprocessor 1 at step S19 applies the amount of travel y2 and the traveling velocity f2 commanded by the command block (g) to the Y-axis controller 8, thereby moving only the spindle motor 14 along the Y axis at the commanded velocity f2 and over the commanded distance y2 to drill a screw hole in the cut end face of the workpiece 18 by the drill 29. Next, when the command block (h) is read (step S12) and it is determined this command block is that which indicates the end of the machining program (step S10), the microprocessor 1 ends processing.

Thus, in accordance with the present invention, the machining performed by the cutter 25 and the machining performed by the drill 29 can be performed continuously. As a result, the efficiency of the operation can be raised in comparison with the prior-art example mentioned above.

Though the above-described embodiment relates to a case where the present invention is applied to an apparatus having a lathe and a drill in combination, the invention is not limited to this embodiment.

Further, though the case described above is one in which a slender, elongated workpiece is cut off and the cut end face thereof is drilled, it is not always necessary to cut off the workpiece, for the invention can be applied to a case where the end face of the workpiece being gripped by the chuck 17 is subjected to drilling after the turning work.

In accordance with the invention as described above, first and second axes are controlled synchronously in accordance with numerical information regarding the first axis by applying a synchronous control command (M80 in the embodiment), and the first and second axes are controlled in accordance with numerical information regarding each of the first and second axes by applying an independent control command (M81 in the embodiment). Therefore, if the present invention is applied to an apparatus of the kind illustrated in the embodiment, the efficiency of the operation can be raised in comparison with the prior art.

What is claimed is:

1. A method for machining a workpiece under control of a microprocessor, comprising the steps of:
    (a) synchronously controlling movement of first and second spindle motors along first and second axes, respectively, in response to a synchronous control command provided by the microprocessor, the first and second spindle motors being coupled to the workpiece;
    (b) performing a first type of machining on the workpiece while the first and second spindle motors are coupled to the workpiece;
    (c) automatically controlling the movement of the second spindle motor independently of the first spindle motor in response to an independent control command from the microprocessor, and uncoupling the first spindle motor from the workpiece; and
    (d) automatically performing a second type of machining while the workpiece is coupled only to the second spindle motor.

2. A method of machining according to claim 1, wherein the first type of machining comprises turning machining and the second type of machining comprises drilling.

3. A numerical control unit comprising:
    means for providing first and second types of machining data, a synchronous control command, and an independent control command;
    a first spindle motor coupled to a workpiece, said first spindle motor being moved along a first axis in accordance with the first type of machining data in response to the synchronous control command;
    a second spindle motor coupled to the workpiece, for moving the workpiece along a second axis in accordance with the first type of machining data in response to the synchronous control command and for moving the workpiece along the second axis in accordance with the second type of machining data in response to the independent control command;

means for performing a first type of machining in accordance with the first type of machining data; and means for performing a second type of machining in accordance with the second type of machining data, the second type of machining being performed while only the second spindle motor is coupled to the workpiece.

* * * * *